United States Patent
Adoni et al.

(10) Patent No.: US 10,129,461 B2
(45) Date of Patent: Nov. 13, 2018

(54) AUTOMATED IMAGE CAPTURE BASED ON IMAGE CONTEXT

(71) Applicant: International Business Machines Corporation, Armonk, NY (US)

(72) Inventors: Siddique M. Adoni, Bangalore (IN); Rahul Chenny, Bangalore (IN); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/369,088

(22) Filed: Dec. 5, 2016

(65) Prior Publication Data

US 2018/0160036 A1   Jun. 7, 2018

(51) Int. Cl.
 *H04N 5/232* (2006.01)
 *G06K 9/46* (2006.01)
 *G06K 9/60* (2006.01)
 *G06K 9/62* (2006.01)
 *H04N 5/907* (2006.01)

(52) U.S. Cl.
 CPC ........... *H04N 5/23222* (2013.01); *G06K 9/46* (2013.01); *G06K 9/605* (2013.01); *G06K 9/6202* (2013.01); *H04N 5/907* (2013.01)

(58) Field of Classification Search
 CPC combination set(s) only.
 See application file for complete search history.

(56) References Cited

U.S. PATENT DOCUMENTS

| | | | |
|---|---|---|---|
| 7,676,145 B2 | 3/2010 | Kuberka et al. | |
| 8,169,484 B2 | 5/2012 | Silberstein | |
| 8,436,930 B2 * | 5/2013 | Choi | H04N 5/23248 348/333.05 |
| 13,520,096 | 8/2013 | Zhang et al. | |
| 2001/0048802 A1 * | 12/2001 | Nakajima | G06T 11/60 386/228 |
| 2007/0263112 A1 * | 11/2007 | Shinkai | H04N 5/23203 348/333.01 |
| 2011/0292248 A1 | 12/2011 | de Leon et al. | |
| 2012/0321131 A1 * | 12/2012 | Kobayashi | H04N 1/00183 382/103 |
| 2013/0342713 A1 * | 12/2013 | Cui | H04N 5/23222 348/207.11 |

* cited by examiner

*Primary Examiner* — Nicholas G Giles
(74) *Attorney, Agent, or Firm* — Erik Johnson; Edell, Shapiro & Finnan, LLC

(57) ABSTRACT

According to an embodiment of the present invention, a system dynamically captures and stores an image based on the context of the image being captured. Initially, an image capture device receives and analyzes an image to determine a first set of one or more attributes associated with the image. A processor compares the first set of attributes associated with the image with a second set of one or more pre-defined attributes associated with an image context indicating preferences for image capture, and, based on the results of the comparing, instructs the image capture device to store the image. Embodiments of the present invention further include a method and computer program product for capturing an image based on the context of the image in substantially the same manner described above.

20 Claims, 10 Drawing Sheets

| SELECT | ATTRIBUTE | ATTRIBUTE VALUE OF CURRENT IMAGE CONTEXT | REFERENCE IMAGE CONTEXT VALUES |
|---|---|---|---|
|  | EYELID POSITION | 75 | 100 |
| X | ANGLE OF SHADOW | 70 | 100 |

FIG.7

AUTOMATED IMAGE CAPTURE BASED ON IMAGE CONTEXT

BACKGROUND

1. Technical Field

Present invention embodiments relate to automated image capture, and more specifically, to dynamic image capturing based on the context of the image being captured.

2. Discussion of the Related Art

Image capturing, e.g., photography, is often a subjective and personal endeavor. As such, the definition of a "perfect" picture for a given target object may vary from person to person. Furthermore, the perception of a picture may largely depend on the skill of the photographer, which itself is subjective and may also vary considerably. Unfortunately, today's digital devices, e.g., mobile cameras, lack the cognitive ability to understand the subjective human elements of the person operating the device and are therefore unable to capture images that compensate for these subjective elements. Accordingly, these image capture devices lack the sophisticated intelligence to aid the photographer in capturing their notion of the "perfect" picture for a given target object.

SUMMARY

According to an embodiment of the present invention, a system dynamically captures, and/or alerts a user, and stores an image based on the context of the image being captured. Initially, an image capture device receives and analyzes an image to determine a first set of one or more attributes associated with the image. A processor compares the first set of attributes associated with the image with a second set of one or more pre-defined attributes associated with an image context indicating preferences for image capture, and, based on the results of the comparing, instructs the image capture device to capture and store the image. Embodiments of the present invention further include a method and computer program product for capturing an image based on the context of the image in substantially the same manner as described above.

BRIEF DESCRIPTION OF THE DRAWINGS

FIG. 7 is an illustration of an example image context attribute table, according to an embodiment of the present invention.

DETAILED DESCRIPTION

Figure 1:
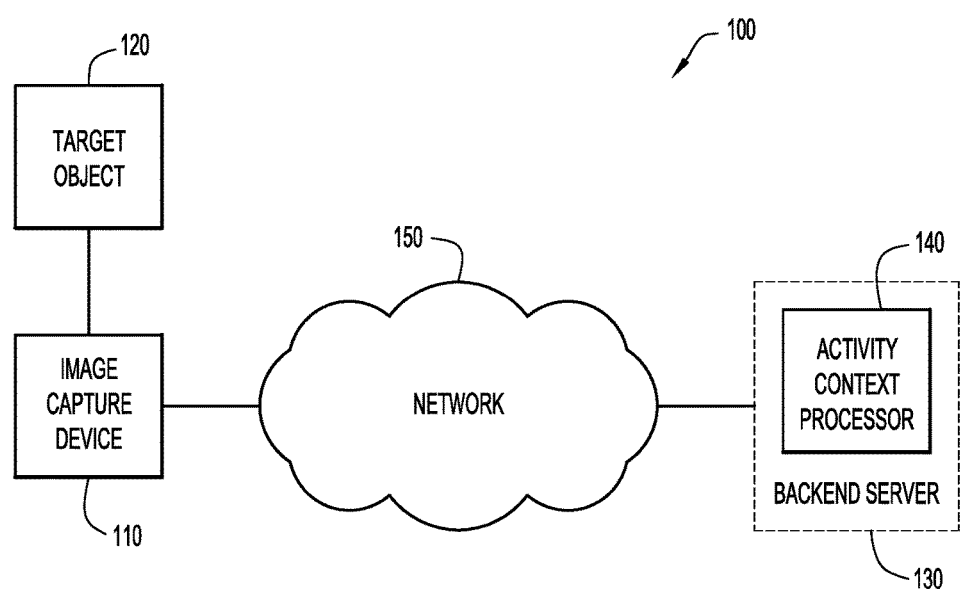
FIG. 1 is a diagrammatic illustration of an example computing environment for use with an embodiment of the present invention.

Present invention embodiments dynamically capture and store one or more images based on the context of the one or more of the images being captured. Initially, an image capture device receives and analyzes an image to determine a first set of one or more attributes associated with the image. A processor compares the first set of attributes associated with the image with a second set of one or more pre-defined attributes based on user preferences associated with the received image, and, based on the results of the comparing, instructs the image capture device to capture and store the image. Embodiments of the present invention further include a method and computer program product for capturing an image based on the context of the image in substantially the same manner as described above.

In general, target and non-target objects within an image are extracted, identified and dynamically analyzed in real-time by one or more analysis techniques to determine whether to capture and store the image. For example, an activity context associated with the image is constructed and then compared to user preferences associated with similar image contexts. These similar image contexts were learned and stored from previously captured and processed images or photographs. The comparison is utilized to determine whether the image context satisfies a threshold number of criteria based at least on the previously stored user preferences.

A profile database further comprises profile attributes associated with the photographer. For example, the profile database may include the photographer's registered ID, photographic details of the device used to capture the image, e.g., make, model, camera sensor, etc., and information indicating whether the image capture device should automatically capture an image if an image context constructed from the image satisfies threshold criteria associated with the user preferences.

The analysis techniques may further transform the extracted information into target objects and ecosystem objects to determine an image context, based at least on the target and ecosystem objects. For example, a processor may construct an image context by identifying and categorizing a target object in the image, e.g., a "dog" that is "movable" and is "trained," or a "statue" of a "human" that is "immovable," as well as one or more non-target objects within the image, e.g., a "tree" that is "immovable," "sways," and has a "shadow." The image processor may further construct a message structure, based on the image context, requesting a backend processor to determine whether a match has occurred between the image context and previously stored user preferences associated with the identified target and ecosystem objects. For example, the message structure of the request message may comprise attributes associated with the photographer, the target object, and non-target objects as well as a preferred confidence level indicating a user-defined threshold that may be used to determine whether an image match has occurred and that the received image should be captured.

Present invention embodiments utilize image analytics to transform an image into objects, e.g., target and ecosystem, most likely to be relevant to a user or photographer in a particular setting (e.g., in a park, at night, in a dimly lit museum, etc.). For example, attributes associated with the objects are identified and compared with previously stored user preferences to determine whether a match has occurred between the attributes and the user preferences, indicating that the image should be captured and stored. The disclosed embodiments may therefore facilitate both professional and recreational photography, making it easier and more cost effective to capture and store ideal pictures, as defined by the subjective preferences of the photographer, regardless of the environment in which the image is captured.

An example computing environment for use with present invention embodiments is illustrated in FIG. 1. Specifically, environment 100 includes an image capture device 110, one or more target objects 120, and one or more backend servers 130. Backend server 130 may comprise one or more activity context processors 140, which are responsible for determining whether a match has occurred between a threshold number of attributes associated with object 120 and previously stored user preferences. Backend server 130 and image capture device 110 may be remote from each other and communicate over a network 150. Network 150 may be implemented by any number of any suitable communications media (e.g., wide area network (WAN), local area network (LAN), Internet, Intranet, etc.). Alternatively, backend server 130 and image capture device 110 may be local to each other, and communicate via any appropriate local communication medium (e.g., local area network (LAN), hardwire, wireless link, Intranet, etc.).

Image capture device 110 enables users to receive one or more images including target object 120 and to determine, from the received one or more images, one or more attributes associated with target object 120 as well as one or more non-target objects associated with the image. For example, image capture device 110 may receive an image including target object 120, e.g., a bird, and determine a set of one or more attributes associated with target object 120, e.g., type of object, category of object, focus point of object, angle and distance to the camera, whether there is a shadow on the object, as well as environmental parameters associated with the image, e.g., time of day, amount of light, etc.

After determining the set of one or more attributes associated with target object 120, and one or more environmental parameters, i.e., ecosystem objects, associated with the image, image capture device 110 may create an image context based on the determined set of attributes and environmental parameters and construct a message structure including the image context. Image capture device 110 may further send the message structure to backend server 130, over network 150, requesting backend server 130 to determine whether the image context of the received image matches a threshold number of previously stored user preferences associated with object 120. For example, backend server 130 may receive a request message from image capture device 110 and forward the request message to activity context processor 140 to determine whether a match has occurred between a threshold number of attributes associated with the received image context and previously stored user preferences associated with the threshold number of attributes.

Activity context processor 140 may further send a response to image capture device 110 indicating whether a match has occurred. For example, if the stored user profile indicates that the user would like an image to be automatically captured whenever a match occurs between an image context of a received image and a threshold number of user preferences associated with the image, image capture device 110 may automatically capture and store the image including target object 120 whenever activity context processor 140 indicates that a match has occurred. If, however, the stored user profile indicates that the user does not want image capture device 110 to automatically capture an image, image capture device 110 may, instead, generate an indication, e.g., visual and/or audio, notifying the user that the attributes associated with object 120 match the user's preferences and that the user should cause device 110 to capture one or more images including object 120, i.e., "The Click Now" ("TCN") moment has occurred.

Figure 2:
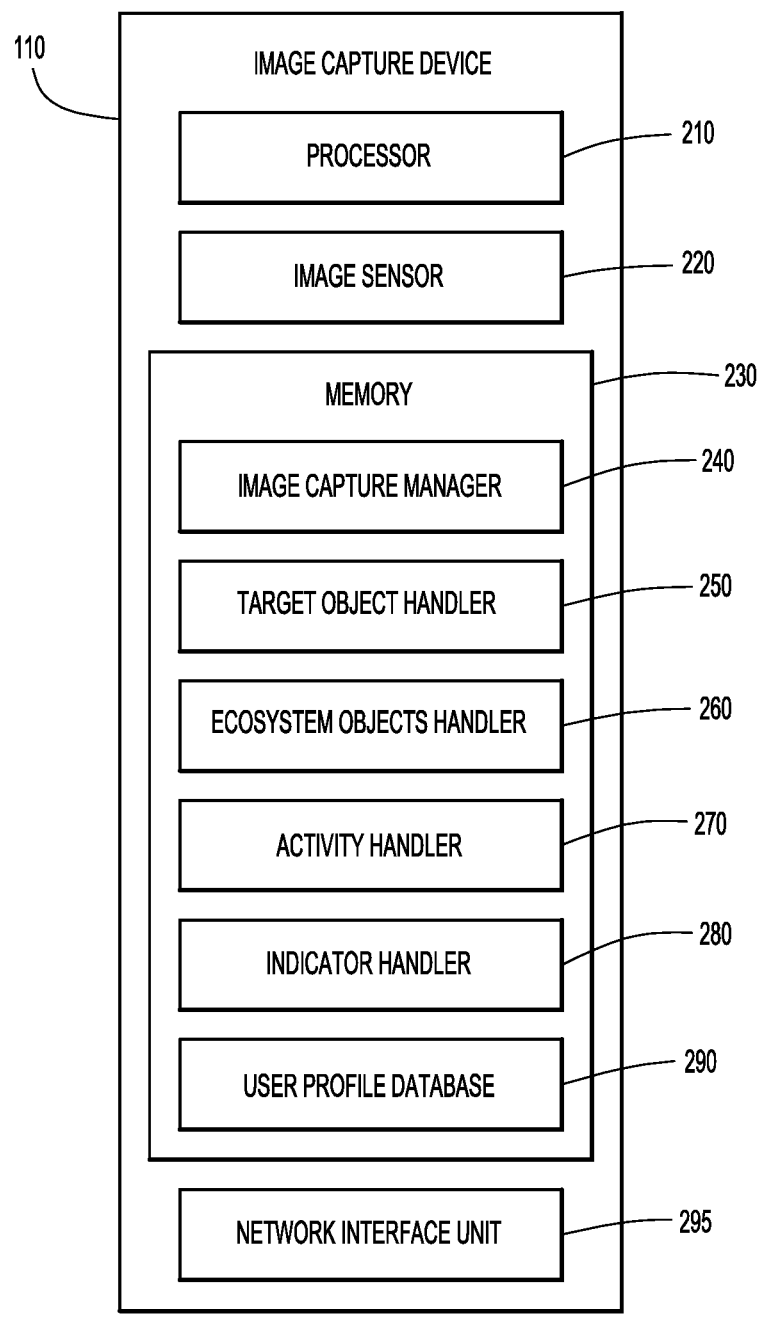
FIG. 2 is a block diagram illustrating the image capture device of FIG. 1 in more detail according to an embodiment of the present invention.

Reference is now made to FIG. 2, which shows an example block diagram of an image capture device 110 configured to perform image capture according to present invention embodiments. It should be understood that there are numerous possible configurations for image capture device 110 and FIG. 2 is meant to be an example of one of the possible configurations. Image capture device 110 includes a processor 210, an image sensor 220, memory 230 and a network interface unit 295. The network interface (I/F) unit (NIU) 295 is, for example, an Ethernet card or other interface device that allows image capture device 110 to communicate over communication network 150. Network I/F unit 295 may include wired and/or wireless connection capabilities.

Processor 210 may include a collection of microcontrollers and/or microprocessors, for example, each configured to execute respective software instructions stored in the memory 230. Memory 230 may include various modules for execution by processor 210, including image capture manager 240, target object handler 250, ecosystem objects handler 260, activity handler 270, indicator handler 280 and user profile database 290. Portions of memory 230 (and the instructions or modules therein) may be integrated with processor 210.

Memory 230 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 230 may comprise one or more computer readable storage media (e.g., a memory device) encoded with software comprising computer executable instructions and when the software is executed (e.g., by processor 210) it is operable to perform the operations described herein. For example, memory 230 stores or is encoded with instructions for image capture manager 240 to perform overall control of the image processing operations described herein by receiving one or more inputs from multiple components, including target object handler 250, ecosystem objects handler 260, activity handler 270 and user profile database 290. Image capture manager 240 is further configured to send a request to backend processor 130 to determine whether one or more images satisfy a threshold number of user preferences associated with object 120 based on an image context associated with the one or more images. In the event that the one or more images satisfy a threshold number of user preferences, image capture manager 240 is further operable to send a request signal to indicator handler 280 to display one or more visual and/or auditory notifications to indicate that an event or moment to capture an image has occurred.

Target object handler 250 uses image analysis and searching techniques to identify target object 120 within an image, e.g., a "dog" or a "statute," and to categorize one or more attributes associated with object 120, e.g., (movable, trained) or (immovable, human). Ecosystem objects handler 260 uses image analysis and searching techniques to identify and categorize one or more ecosystem objects within an image of object 120, e.g., a "tree," as well as one or more attributes associated with the one or more ecosystem objects, e.g., (immovable, shadow, sway motion).

Activity handler 270 processes the one or more target objects 120 identified and categorized by target object handler 250 and the one or more ecosystem objects identified and categorized by ecosystem objects handler 260 to create a message structure that image capture manager 240 may forward to backend server 130 to determine whether the image of object 120 matches pre-determined user preferences associated with object 120.

Indicator handler 280 displays an indication to the user, visual and/or auditory, notifying the user when a match has occurred between a threshold number of attributes associated with a received image and predetermined user preferences for the attributes, i.e., a moment for image capture has occurred. Indicator handler 280 may be further configured to automatically capture one or more images of object 120 if the user has previously set a click flag, e.g., set to "yes," requesting image capture device 110 to automatically capture an image whenever an image context matches a predefined number of user preferences associated with target object 120.

Image capture manager 240, target object handler 250, ecosystem objects handler 260, activity handler 270, and indicator handler 280 may include one or more modules or units to perform the various functions of present invention embodiments described below. The various modules (e.g., image capture manager module, target object handler module, ecosystem objects handler module, activity handler module, indicator handler module, etc.) may be implemented by any combination of any quantity of software and/or hardware modules or units, and may reside within memory 230 of image capture device 110 for execution by processor 210.

Memory 230 may further provide user profile database 290, which stores various information used and generated by image capture manager 240 for image contextual analysis associated with a user of image capture device 110. For example, user profile database 290 may store one or more registered IDs associated with one or more photographers; information associated with image capture device 110 (e.g., make, model, camera sensor, etc.); and capture attribute information associated with device 110 (e.g., an on/off flag indicating whether the automated capture functionality described herein should be enabled and a click flag indicating whether an image should be automatically captured if a match between an image context and user preferences is detected). User profile database 290 may be implemented by any conventional or other database or storage unit, may be local to or remote from image capture device 110, and may communicate via any appropriate communication medium (e.g., local area network (LAN), wide area network (WAN), Internet, hardwire, wireless link, Intranet, etc.).

Figure 3:
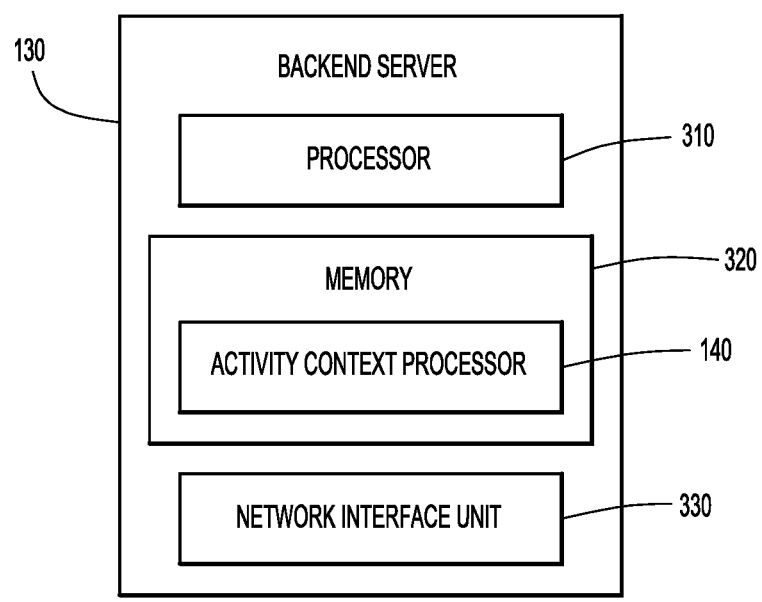
FIG. 3 is a block diagram illustrating the backend server of FIG. 1 in more detail according to an embodiment of the present invention.

Reference is now made to FIG. 3, which shows an example block diagram of backend server 130 configured to perform image processing according to present invention embodiments. It should be understood that there are numerous possible configurations for backend server 130 and FIG. 3 is meant to be an example of one of the possible configurations. Backend server 130 includes a processor 310, memory 320 and a network interface unit 330. The network interface (I/F) unit (NIU) 330 is, for example, an Ethernet card or other interface device that allows the backend server 130 to communicate over communication network 150. Network I/F unit 330 may include wired and/or wireless connection capabilities.

Processor 310 may include a collection of microcontrollers and/or microprocessors, for example, each configured to execute respective software instructions stored in the memory 320. Portions of memory 320 (and the instruction therein) may be integrated with processor 310.

Memory 320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 320 may comprise one or more computer readable storage media (e.g., a memory device) encoded with software comprising computer executable instructions and when the software is executed (e.g., by processor 310) it is operable to perform the operations described herein. For example, memory 320 stores or is encoded with instructions or modules for activity context processor 140, which is configured to process attributes associated with an image of target object 120 to determine whether the image of target object 120 should be captured and stored at image capture device 110. Optionally, image capture 110 and/or backend server 130 may, individually or in combination, include activity context processor 140 to perform the image analysis to determine whether an image should be captured and stored according to the subjective preferences of the user.

Backend server 130 may be implemented by any conventional or other computer systems preferably equipped with a display or monitor, a base (e.g., including at least one processor 310, one or more memories 320 and/or internal or external network interfaces or communications devices 330 (e.g., modem, network cards, etc.)), optional input devices (e.g., a keyboard, mouse or other input device), and any commercially available and custom software (e.g., server/communications software, activity context processor module, etc.).

Figure 4:
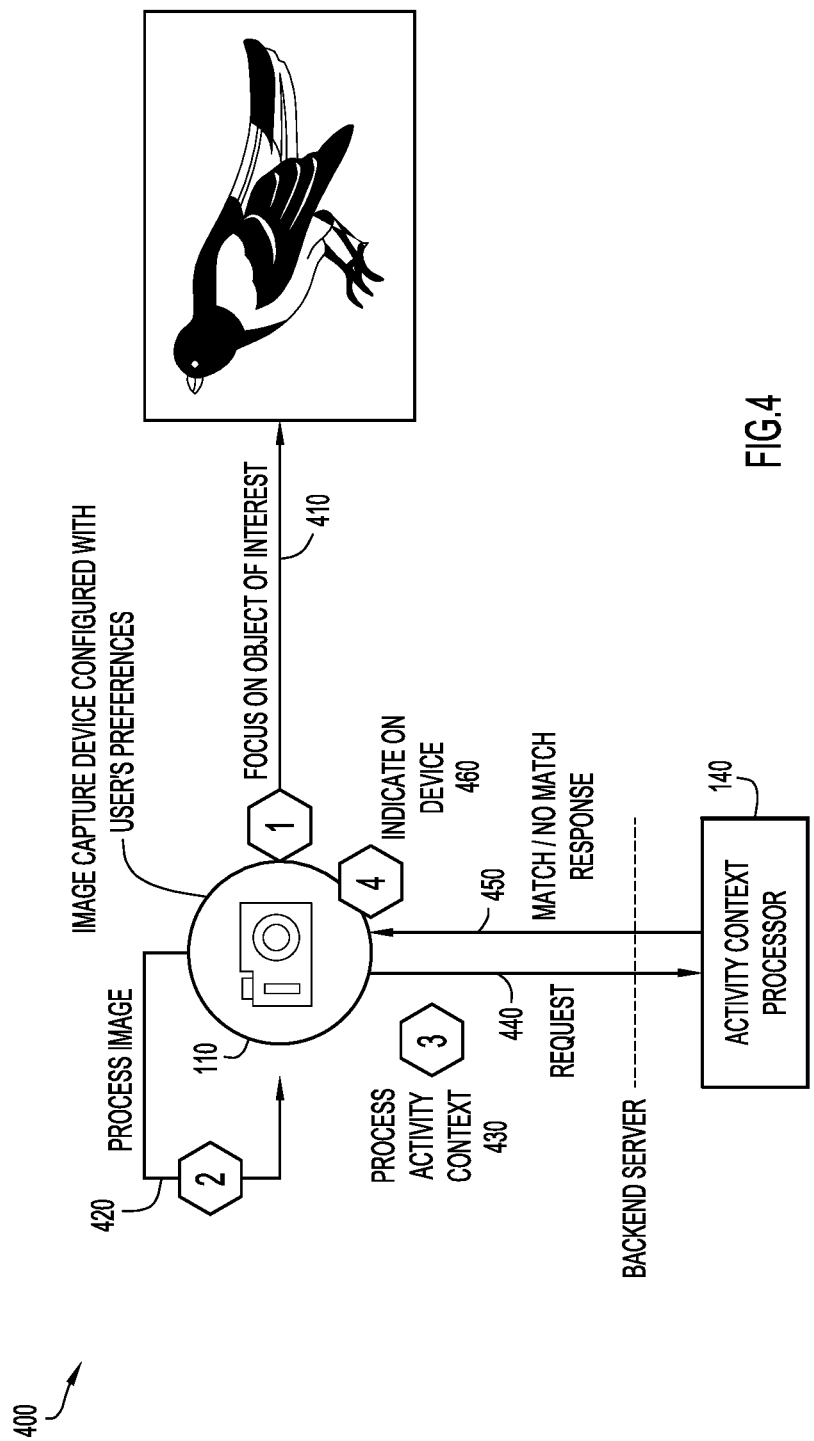
FIG. 4 is a diagrammatic illustration of a manner in which an image is captured based on image context according to an embodiment of the present invention.

A manner in which an image is captured based on image context (e.g., via image capture device 110 and backend server 130) according to an embodiment of the present invention is illustrated in FIG. 4. In accordance with process 400, image capture device 110 may be preconfigured with user preferences. Initially, a user may focus and/or adjust one or more lenses residing in image capture device 110 such that the image capture device receives an image including a target object 120 at step 410. The one or more lenses may be any software or hardware mechanism, or any combination thereof, configured to capture one or more images including target object 120.

Image capture device 110 processes the received one or more images including target object 120 at step 420. For example, image capture manager 240 may orchestrate image processing by managing multiple components within image capture device 110, e.g., target object handler 250, ecosystem objects handler 260, activity handler 270, and indicator handler 280, to identify and categorize both target object 120 and one or more ecosystem objects in the received image. After processing the received image, activity handler 270 may construct, based on target object 120 and one or more ecosystem objects in the received image, a message requesting activity context processor 140 determine whether the received image matches a threshold level of predefined user preferences at step 430. After constructing the message, image capture device 110 forwards the message to activity context processor 140 at step 440.

Activity context processor 140 receives the constructed message from image capture manager 240 and, using the information included in the message, determines whether the attributes associated with the received image match the user preferences associated with target object 120. A response message is sent to image capture manager 240 indicating whether a match has occurred at step 450. Image capture manager 240 forwards the response message to indicator handler 280, which generates a signal causing a display and/or one or more speakers in image capture device 110 to indicate whether the image context of the received image matches the user preferences associated with target object 120 at step 460, and process 400 ends.

Figure 5:
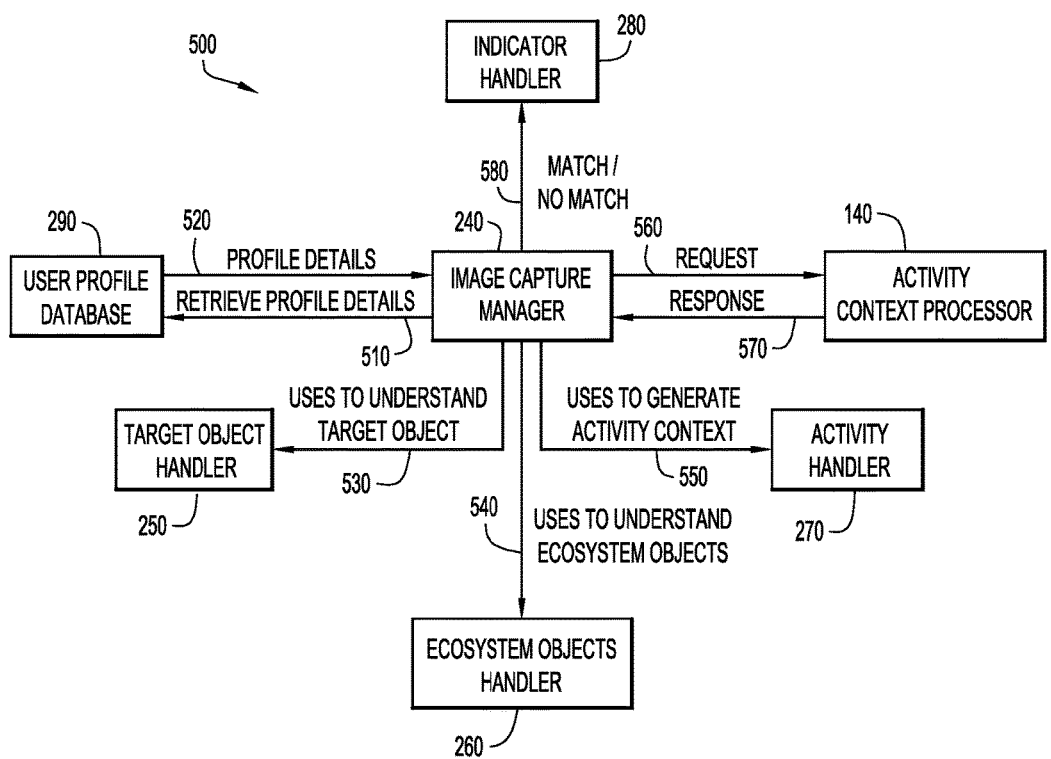
FIG. 5 is an illustration of a manner in which an image is processed in the image capture device of FIG. 1 according to an embodiment of the present invention.

FIG. 5 is an illustration of a manner in which an image is processed in the image capture device of FIG. 1 according to an embodiment of the present invention. In accordance with process 500, image capture device 110 may be preconfigured with user preferences. Initially, after image capture device 110 receives one or more images including target object 120, image capture manager 240 requests user profile information from user profile database 290 at step 510. The user profile information stored in user profile database 290 may include a photographer's registered ID associated with the user, information about image capture device 110 including make and model of device 110 as well as type of image sensor, lens, etc., and capture attributes such as an on/off flag indicating whether the automated capture functionality disclosed herein should be enabled and a click flag indicating whether image capture device 110 should automatically capture and store an image whenever a threshold number of attributes associated with object 120, i.e., the image context, matches the user preferences for the attributes associated with object 120. User profile database 290 forwards the requested user profile information to image capture manager 240 at step 520.

Target object handler 250 identifies a target object 120 in the received image and determines, based on the user profile information, whether the identified target object 120 is enabled for automated capture, e.g., birds—Y/N, cars—Y/N, at step 530. Target object handler 250 is further configured to use any object/image search techniques currently known or later developed to understand target object 120 and categorize attributes associated with target object 120. For example, in response to image capture device 110 receiving an image of a dog, target object handler 250 may heuristically compare the received image with similar images stored on backend server 130 and/or a cloud-based server to determine that target object 120 in the received image is a dog and to further determine that the dog is movable and is trained.

Similarly, ecosystem objects handler 260 identifies one or more non-target objects in the received image and, using currently known or later developed object/image search techniques, identifies one or more relevant attributes associated with the one or more non-target objects to understand and categorize the one or more identified non-target objects at step 540. For example, ecosystem objects handler 260 may heuristically compare the one or more identified non-target objects with similar images stored on backend server 130 and/or a cloud-based server to determine that a non-target object in the received image is a tree and to further determine that the tree is immovable, casts a shadow and exhibits a swaying motion.

Using the identified target object 120 and non-target objects, as well as the attributes associated with each of the objects, activity handler 270 processes each of the objects to create a message structure for a request message at step 550. For example, the message structure for the request message may include the ID of the registered photographer, the capabilities of image capture device 110, attributes of target object 120, how the image of object 120 is captured, aspects of the ecosystem and a preferred confidence level specifying the number of attributes associated with object 120 that must match corresponding user preferences associated with object 120 for a match to occur.

Image capture manager 240 forwards the request message structure to activity context processor 140 at step 560. In response to receiving the request message, activity context processor 140 determines whether the received image context matches the subjective user preferences associated with object 120, satisfying the user's minimum preferred confidence level, and sends a response signal to image capture manager 240 indicating whether the received image matches the predefined user preferences at step 570. Image capture manager 240 forwards the response message to indicator handler 280, which causes a display and/or one or more speakers to notify the user that the image does, or does not, match the user's preferences for target object 120 at step 580, and process 500 ends.

Figure 6B:
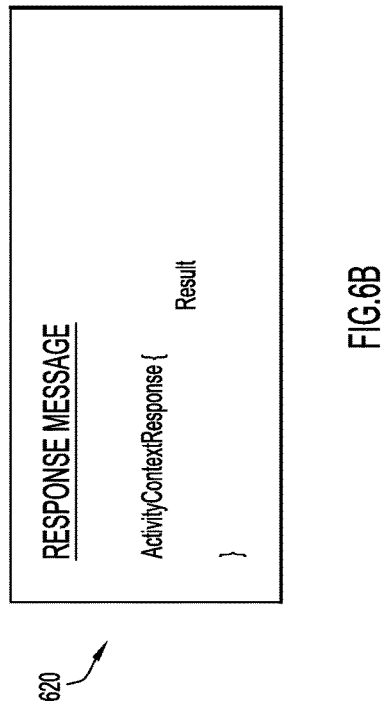
FIGS. 6A-6B are illustrations of example message exchange structures according to an embodiment of the present invention.
Figure 6A:

An example request message (FIG. 6A) may include several attributes corresponding to an image context of a received image. By way of example, request message 610 may include photographer, target object and ecosystem attributes as well as a user-defined preferred confidence level. Example photographer attributes may include information identifying an ID of a registered photographer and capabilities associated with image capture device 110, including, but not limited to, make and model of device 110 as well as a resolution, exposure, aperture and digital sensor associated with image sensor 220. Example target object attributes may describe target object 120 and how the one or more images including object 120 is captured. For example, a type attribute may identify/specify target object 120, a category attribute may specify whether object 120 is movable or immovable, a focus point attribute may specify a focal point of interest in target object 120, e.g., a face of a statue versus the body of the statue, a size attribute may identify the size of object 120, a distance attribute may enumerate the distance between object 120 and the photographer, an angle attribute may identify an angle of incidence between image capture device 110 and target object 120, a view type attribute may specify a view type of object 120 with respect to image capture device 110, e.g., top view, side view, front view, etc., and a shadow attribute may specify whether a shadow is on object 120 in the received image. Example ecosystem attributes may describe aspects in the received image other than target object 120. For example, a time attribute may indicate a time of day at which the received image was taken and a light attribute may indicate the ambient light level in the received image, e.g., number of lumens. An example preferred confidence level may further specify the percentage of any given number of attributes associated with object 120 that must match the corresponding user preferences in order for a match to occur.

An example response message (FIG. 6B) may include a response from activity context processor 140 corresponding to a request message received from image capture manager 240. By way of example, response message 620 may include a result field specifying whether the image context associated with object 120 matches the subjective preferences of the user. Image capture manager 240 may receive response message 620 from activity context processor 140 and forward it to indicator handler 280 to notify the user or photographer that a match has occurred and, accordingly, one or more images including target object 120 should be captured and stored.

An image context table 700 in accordance with a manner in which a backend server 130 is employed to determine matches with user preferences and to create or update attributes of an image context associated with target object 120 is illustrated in FIG. 7. Initially, activity context processor 140 receives a message from image capture manager 240 pertaining to an image including target object 120 captured by a user (e.g., the user has taken a picture). If activity context processor 140 has not previously stored user preferences associated with target object 120, activity context processor 140 creates an image context for the target object. For example, one or more attributes associated with target object 120 and one or more ecosystem objects are extracted by analyzing one or more reference images and/or the captured image including target object 120. An initial or default reference context value is assigned to each of the attributes in the newly created image context lacking a value in the captured image associated with target object 120 and the one or more ecosystem objects. The remaining attributes of the newly created image context are initially set to the values determined from the captured image. It should be understood that the one or more reference images may be stored locally on backend server 130 or image capture device 110, or remotely on one or more cloud-based servers, or on a combination of both local and remote storage means. According to one embodiment of the present invention, activity context processor 140 may assign a default value of 100 in the newly created image context for each of the attributes associated with target object 120 and the one or more ecosystem objects lacking in the captured image. After assigning the image context values, activity context processor 140 may create image context table 700 and store the values for the attributes in table 700 to be used for further analysis and image processing. It should be understood that one or more tables 700 may be created for each target object 120 and that an image context associated with target object 120 may be updated based on use.

After determining image context values for each of the one or more attributes, activity context processor 140 may store the one or more determined image context values in image context table 700 associated with target object 120, enabling activity context processor 240 to subsequently determine whether a match occurs between a currently received image (e.g., an image being viewed prior to capture and storage) including target object 120 and one or more user preferences, i.e., reference image context values, associated with object 120. For example, if a predetermined threshold number of attributes associated with target object 120 and one or more ecosystem objects extracted from a currently received image match the corresponding reference image context values in table 700 associated with object 120, activity context processor 240 may determine that the currently received image including object 120 matches the predefined user preferences and should be captured and stored. In this way, activity context processor 140 may be responsible for processing requests received from image capture manager 240 to determine whether a match has occurred between a previous image context associated with target object 120 and an image context associated with a currently received image including object 120.

The present invention further enables a photographer, or a user of image capture device 110, to optionally define a preferred confidence level that activity context processor 140 may use to determine whether an image context associated with a currently received image matches predefined user preferences associated with object 120. For example, a photographer may define a preferred confidence level to specify the percentage number of a given set of attributes associated with a currently received image including object 120 that must match the corresponding attributes in predefined user preferences, i.e., reference image context values, in table 700. According to an embodiment of the present invention, a match between an attribute associated with target object 120 or an ecosystem object included in a currently received image matches the corresponding reference image context value in table 700 if the determined value of the attribute associated with the currently received image is within any desired predetermined range of the corresponding reference image context value, e.g., ±5 points.

Accordingly, activity context processor 140 may use the preferred confidence level to determine whether a match has occurred, and, after determining whether a match has occurred, may return either a match or no match indication in response message 620 to notify image capture manager 240 that a match has, or has not, occurred. As such, to determine whether a match has occurred between a currently received image including object 120 and the corresponding user preferences associated with object 120, activity context processor 140 may calculate the difference between each attribute value in a given set of attributes associated with a currently received image and the corresponding predefined user preferences associated for the attributes in the corresponding image context.

For example, as shown in FIG. 7, the attribute value for the attribute eyelid position in a currently received image including object 120 may be determined to be 75, and the attribute value for the attribute angle of shadow may be determined to be 70. Activity context processor 140 may thus calculate the difference between each attribute value associated with the currently received image and the predefined user preferences for the corresponding attributes. That is, if an attribute value associated with a currently received image must be within a range of 5 points of the corresponding user preference for a match to have occurred, activity context processor 140 may determine that a match has not occurred between the attribute values shown in FIG. 7 associated with the currently received image including object 120 and the corresponding reference image context values for the attributes, e.g., 100, and return a value of "no match" to image capture manager 240.

Furthermore, if image capture manager 240 determines that a user has captured an image when activity context processor 140 indicated that no match had occurred, or if image capture manager 240 determines that the user has not captured an image when activity context processor 140 indicated that a match had occurred, activity context processor 140 may dynamically update the reference image context values in table 700 to be equal to the one or more attribute values associated with target object 120 or one or more ecosystem objects in the captured image. In this way, table 700 is continuously updated to more accurately reflect user preferences learned from previously captured and processed images, enabling activity context processor 140 to optimize its ability to determine when a match occurs between an image including a target object 120 and predefined user preferences associated with object 120 by basing this decision on preprocessed cognitive insights learned from the previously captured and processed images.

By way of example, if a user captured an image when activity context processor 140 indicated a match did not occur between the current attribute value for an eyelid position of object 120 and reference value for the eyelid position, as shown in FIG. 7, activity context processor may update the reference value in table 700 to reflect the attribute value associated with the current image context, i.e., update the reference value from 100 to 75. Thus, when an image context is created with one or more initial attribute values of 100 (e.g., effectively preventing a match), subsequent images including object 120 captured by the user are used to replace or adjust the attribute values associated with object 120 and/or one or more ecosystem objects in the subsequently captured images.

Figure 8A:
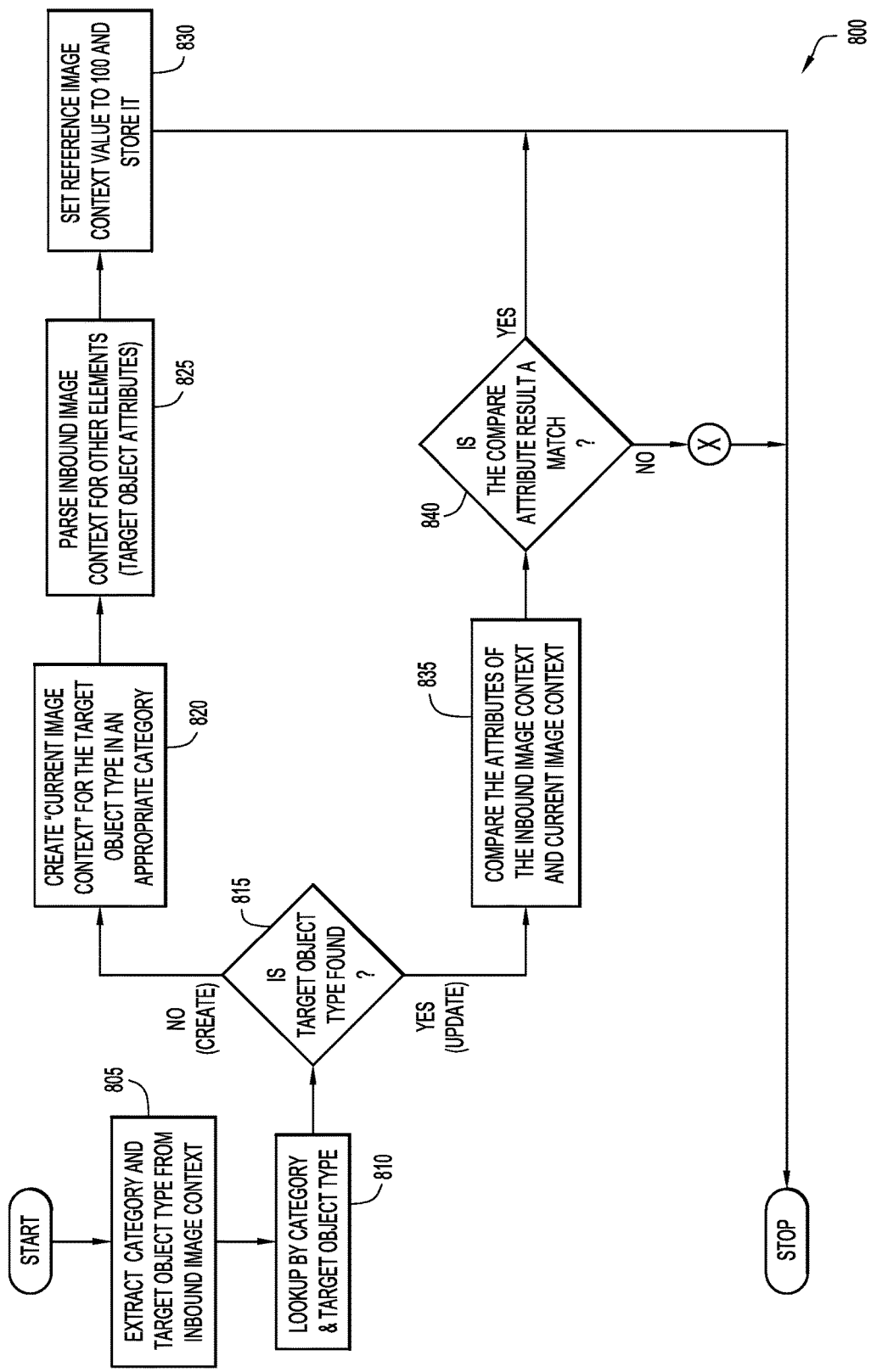
FIGS. 8A-8B are a procedural flow chart illustrating a manner in which an image context is created and an attribute table associated with the image context is created or updated according to an embodiment of the present invention.
Figure 8B:
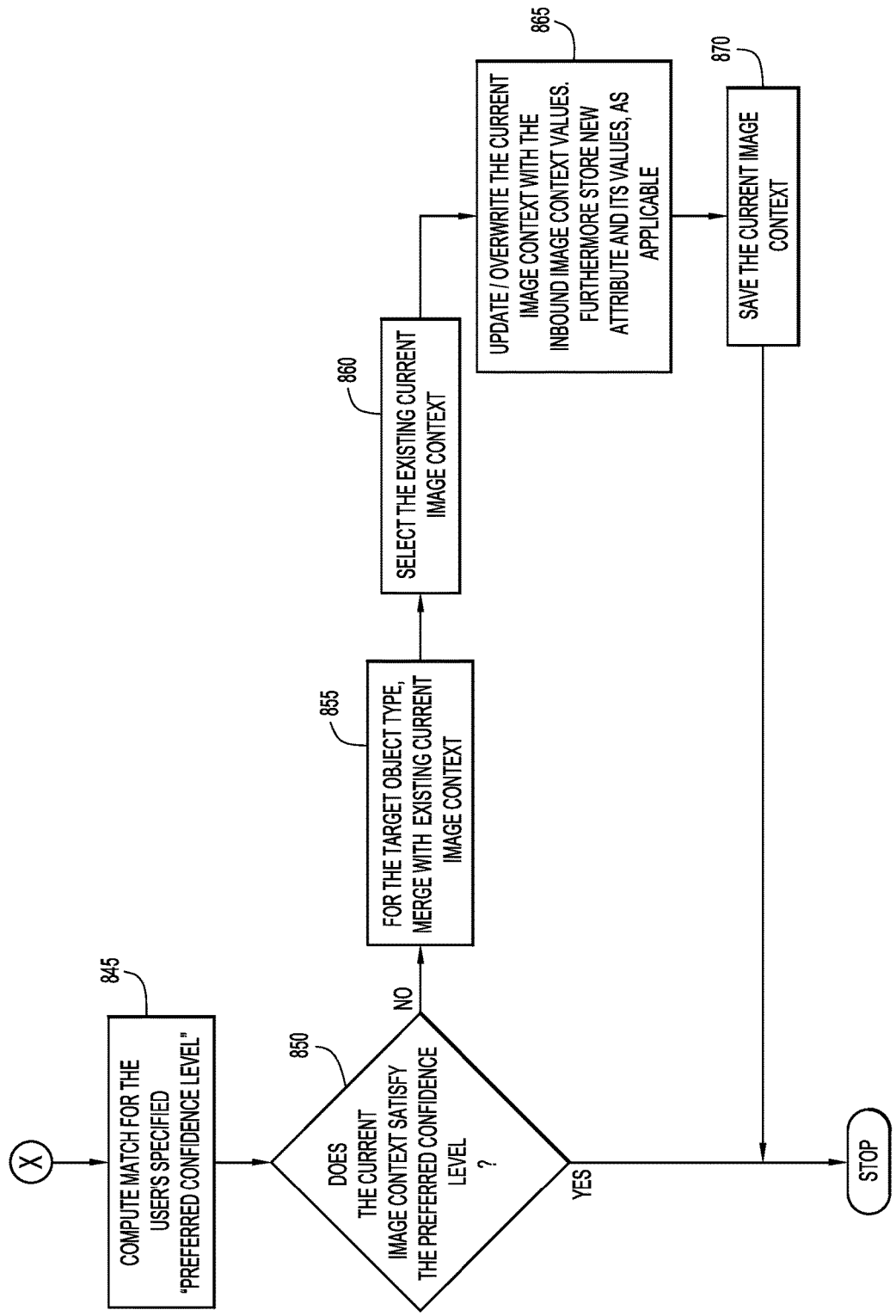

With reference to FIGS. 8A-8B, there is depicted a procedural flow chart illustrating a method 800 in which an image context associated with a captured image (e.g., an image captured and stored by the user) is created and in which attribute table 700 associated with the image context is created or updated, according to an embodiment of the present invention. Method 800 is performed primarily by activity context processor 140.

At 805, activity context processor 140 extracts a category and target object from an inbound image context for the captured image, e.g., received in request message 610. At 810, processor 140 attempts to lookup the received image context by category and target object type to determine, at 815, whether an image context associated with the category and target object 120 has been previously created. If processor 140 determines that a previous image context associated with the category and target object 120 has not been previously created, flow proceeds to 820. Otherwise, flow proceeds to 835.

At 820, activity context processor 140 creates an image context for a currently received and captured image, including object 120 associated with the category and type of target object 120 included in the captured image. At 825, activity context processor 140 parses the inbound image context, e.g., included in request message 610, to extract attributes or other elements associated with target object 120 included in the image. At 830, processor 140 sets the initial values in the image context for the extracted attributes or elements associated with target object 120 to the values in the image context. Furthermore, any attributes associated with target object 120 and/or one or more ecosystem objects identified in the captured image, but which are not included in the inbound image context, may be set to an initial default reference value, e.g., 100. After setting the initial reference values for the extracted and/or missing attributes, method 800 ends.

At 835, activity context processor 140 compares the values of one or more attributes included in the inbound image context with the corresponding attribute values associated with a previously created image context for target object 120 to determine, at 840, whether each of the one or more attributes in the inbound image context matches the corresponding attribute values associated with a previously created image context for target object 120. If it is determined that each of the one or more attributes in the inbound image context matches the corresponding attribute values associated with a previously created image context for target object 120, activity context processor 140 indicates that a match has occurred and method 800 ends (since the image has been captured in accordance with user preferences and no update is needed). Otherwise, flow proceeds to 845.

At 845, activity context processor 140 determines the percentage number of attributes in the inbound image context that match, e.g., within a predefined range of values, the corresponding attribute values associated with a previously created image context for target object 120. At 850, using the value for the preferred confidence level specified by the user, activity context processor 140 determines whether the percentage number of attributes in the inbound image context matching the corresponding attribute value associated with a previously created image context for target object 120 satisfies the percentage criteria specified in the preferred confidence level and, if so, activity context processor 140 indicates that a match has occurred and method 800 ends (since the image has been captured in accordance with user preferences and no update is needed). Otherwise, flow proceeds to 855.

At 855, activity context processor 140 merges, for the target object type, the attributes for the current image context associated with object 120 with the attributes of an existing image context associated with object 120. At 860, activity context processor 140 selects, based on target object type, a current image context associated with object 120 and, at 865, updates or overwrites one or more attribute values associated with the selected current image context with the corresponding attribute values included in the inbound image context (since the image has been captured with new user preferences and an update is needed to capture these new user preferences). Activity context processor 140 may further add and store to the current image context one or more attributes, and their associated values, that were identified in the captured image and included in the inbound image context but were not previously included in the current image context. At 870, activity context processor 140 saves the updated current image context and method 800 ends.

Figure 9:
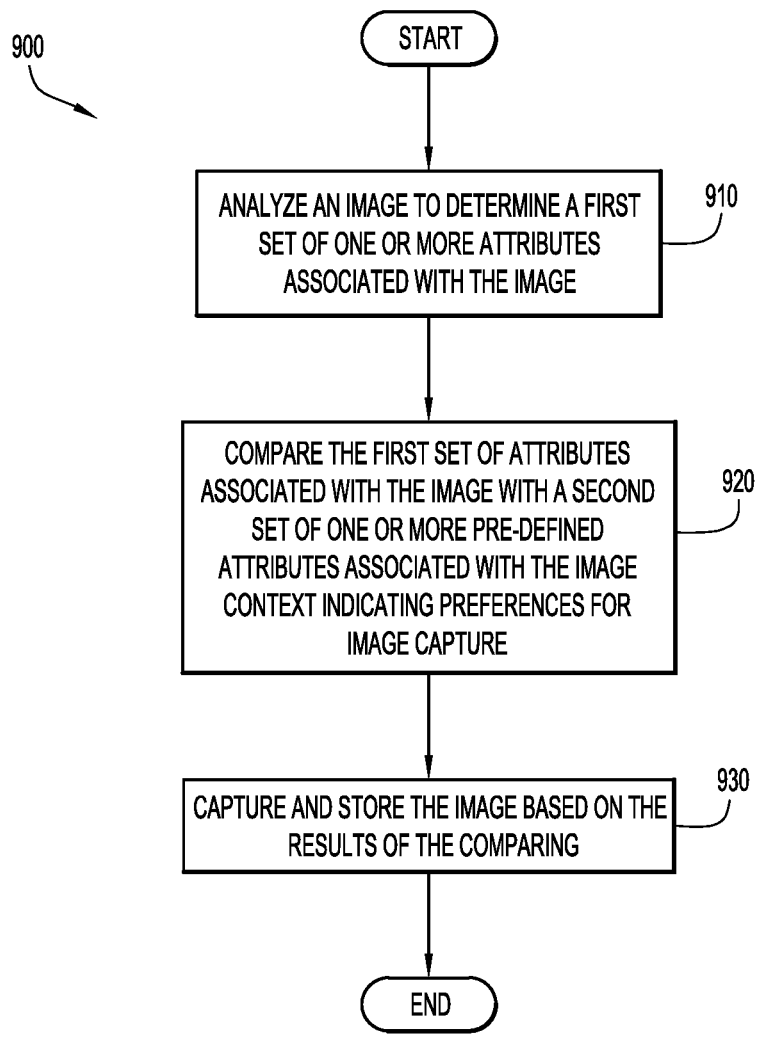
FIG. 9 is a procedural flow chart illustrating a manner in which an image is captured based on an image context according to an embodiment of the present invention.

With reference to FIG. 9, there is depicted a procedural flow chart illustrating a method 900 in which an image is captured based on an image context according to an embodiment of the present invention.

At 910, a received is image is analyzed to determine a first set of one or more attributes associated with the image.

At 920, the first set of one or more attributes associated with the image is compared with a second set of one or more predefined attributes associated with an image context indicating preferences for image capture.

At 930, the received image is captured and stored based on the results of the comparing, and method 900 ends.

It will be appreciated that the embodiments described above and illustrated in the drawings represent only a few of the many ways of implementing embodiments for automated image capture based on image context.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.).

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., image capture manager, target object handler, ecosystem objects handler, activity handler, indicator handler, activity context processor, etc.). These systems may include any types of monitors and input devices (e.g., keyboard, mouse, voice recognition, etc.) to enter and/or view information.

It is to be understood that the software (e.g., image capture manager, target object handler, ecosystem objects handler, activity handler, indicator handler, activity context processor, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., image capture manager, target object handler, ecosystem objects handler, activity handler, indicator handler, activity context processor, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store images (e.g., digital images, analog images, videos, sonograms, MRIs, contexts, etc.). The database system may be implemented by any number of any conventional or other databases, data stores or storage structures (e.g., files, databases, data structures, data or other repositories, etc.) to store information (e.g., images, videos, sonograms, MRIs, contexts, etc.). The database system may be included within or coupled to the server and/or client systems. The database systems and/or storage structures may be remote from or local to the computer or other processing systems, and may store any desired data (e.g., images, videos, sonograms, MRIs, contexts, etc.).

The present invention embodiments may employ any number of any type of user interface (e.g., Graphical User Interface (GUI), command-line, prompt, etc.) for obtaining or providing information (e.g., documents, analytics, annotations, user or other preferences, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion. The report may include any information arranged in any fashion, and may be configurable based on rules or other criteria to provide desired information to a user (e.g., images, videos, sonograms, MRIs, etc.).

The present invention embodiments are not limited to the specific tasks or algorithms described above, but may be utilized for any type of images (e.g., analog images, digital images, videos, sonograms, MRIs, etc.) to perform any type of image capturing on any type of image capture device (e.g., camera, smartphone, medical imaging device, etc.). Furthermore, the image capture device described herein may be performed by any user (e.g., photographer, videographer, medical device specialist, etc.) on any image capture device (e.g., camera, smartphone, medical imaging device, etc.) to capture and/or produce any type of image (e.g., analog images, digital images, videos, sonograms, MRIs, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of capturing an image based on image context comprising:
    analyzing an image viewed by a user via an image capture device to determine a first set of one or more attributes associated with the image prior to image capture;
    comparing the first set of one or more attributes associated with the image with a second set of one or more pre-defined attributes associated with the user and an image context indicating preferences for image capture, wherein the one or more pre-defined attributes include values that are derived from prior images captured by the user;
    capturing and storing the image based on results of the comparing satisfying a confidence level, wherein the confidence level indicates a percentage of the set of one or more attributes required to match the one or more pre-defined attributes; and
    updating the values of the second set of one or more pre-defined attributes based on the captured image.

2. The method of claim 1, wherein the first set of one or more attributes associated with the image comprises one or more attributes associated with a target object included in the image.

3. The method of claim 2, wherein the one or more attributes associated with the target object included in the image include type of target object, category of the target object, focus point of interest in the target object, size of the target object, distance between the target object and the image capture device, angle between the target object and the image capture device, view type of the target object, and a shadow indicator.

4. The method of claim 2, wherein the first set of one or more attributes associated with the image further comprises attributes associated with one or more ecosystem objects included in the image.

5. The method of claim 4, wherein the one or more ecosystem objects included in the image comprise time of day and ambient light level of the image.

6. The method of claim 1, wherein updating the values further comprises updating the pre-defined attributes associated with the image context to be equal to the first set of one or more attributes associated with the image.

7. The method of claim 1, wherein the capturing and storing of the image occurs automatically based on results of the comparing.

8. The method of claim 1, wherein the capturing and storing of the image further comprises providing an indicator to the user to manually capture the image.

9. A system for capturing an image based on image context comprising:
    at least one processor configured to:
        analyze an image viewed by a user via an image capture device to determine a first set of one or more attributes associated with the image prior to image capture;
        compare the first set of one or more attributes associated with the image with a second set of one or more pre-defined attributes associated with the user and an image context indicating preferences for image capture, wherein the one or more pre-defined attributes include values that are derived from prior images captured by the user;
        capture and store the image based on results of the comparing satisfying a confidence level, wherein the confidence level indicates a percentage of the set of one or more attributes required to match the one or more pre-defined attributes; and
        update the values of the second set of one or more pre-defined attributes based on the captured image.

10. The system of claim 9, wherein the first set of one or more attributes associated with the image comprises one or more attributes associated with a target object included in the image.

11. The system of claim 10, wherein the one or more attributes associated with the target object included in the image include type of target object, category of the target object, focus point of interest in the target object, size of the target object, distance between the target object and the image capture device, angle between the target object and the image capture device, view type of the target object, and a shadow indicator.

12. The system of claim 10, wherein the first set of one or more attributes associated with the image further comprises attributes associated with one or more ecosystem objects included in the image.

13. The system of claim 12, wherein the one or more ecosystem objects included in the image comprise time of day and ambient light level of the image.

14. The system of claim 9, wherein the capturing and storing of the image occurs automatically based on results of the comparing.

15. The system of claim 9, wherein the capturing and storing of the image further comprises providing an indicator to the user to manually capture the image.

16. The system of claim 9, wherein updating the values further comprises updating the pre-defined attributes associated with the image context to be equal to the first set of one or more attributes associated with the image.

17. A computer program product for capturing an image based on image context comprising:
    a computer readable storage medium having program instructions embodied therewith, the program instructions executable by at least one processor to cause the at least one processor to:
        analyze an image viewed by a user via an image capture device to determine a first set of one or more attributes associated with the image prior to image capture;
        compare the first set of one or more attributes associated with the image with a second set of one or more pre-defined attributes associated with the user and an image context indicating preferences for image capture, wherein the one or more pre-defined attributes include values that are derived from prior images captured by the user;
        capture and store the image based on results of the comparing satisfying a confidence level, wherein the confidence level indicates a percentage of the set of one or more attributes required to match the one or more pre-defined attributes; and
        update the values of the second set of one or more pre-defined attributes based on the captured image.

18. The computer program product of claim 17, wherein the capturing and storing of the image occurs automatically based on results of the comparing.

19. The computer program product of claim 17, wherein the capturing and storing of the image further comprises providing an indicator to the user to manually capture the image.

20. The computer program product of claim 17, wherein updating the values further comprises updating the pre-defined attributes associated with the image context to be equal to the first set of one or more attributes associated with the image.

* * * * *